US011059066B2

(12) United States Patent
Marcon (10) Patent No.: US 11,059,066 B2
(45) Date of Patent: Jul. 13, 2021

(54) COATING BOOTH (71) Applicant: CARLISLE FLUID TECHNOLOGIES, INC., Scottsdale, AZ (US)

(72) Inventor: Henry Marcon, Balgach (CH)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days.

(21) Appl. No.: 17/048,049

(22) PCT Filed: Feb. 18, 2019

(86) PCT No.: PCT/IB2019/051290
§ 371 (c)(1),
(2) Date: Oct. 15, 2020

(87) PCT Pub. No.: WO2019/202412
PCT Pub. Date: Oct. 24, 2019

(65) Prior Publication Data
US 2021/0146392 A1 May 20, 2021

(30) Foreign Application Priority Data
Apr. 16, 2018 (GB) .................................. 1806201

(51) Int. Cl.
B05B 16/00 (2018.01)
B05B 13/02 (2006.01)
(Continued)

(52) U.S. Cl.
CPC ........ B05B 13/0214 (2013.01); B05B 13/041 (2013.01); B05B 14/44 (2018.02);
(Continued)

(58) Field of Classification Search
None
See application file for complete search history.

(56) References Cited

U.S. PATENT DOCUMENTS 5,056,460 A * 10/1991 Vohringer ............... B05B 14/48
118/634
5,063,835 A * 11/1991 Rockx ..................... B05B 16/60
454/50
(Continued)

FOREIGN PATENT DOCUMENTS

CN 105964435 A 9/2016
CN 206104150 U 4/2017
(Continued)

OTHER PUBLICATIONS

English translation of CN105964435.*
(Continued)

Primary Examiner — Charles Capozzi
(74) Attorney, Agent, or Firm — Fletcher Yoder, P.C.

(57) ABSTRACT

A coating booth (101) for elements to be coated. The coating booth (101) comprises a passage between opposing vertical sides (107a, 107b, 108a, 108b) through which elements to be coated are conveyed. There is an entrance (105) at one end of the passage and an exit (106) at the other end of the passage. The coating booth (101) comprises a conveyor line (102) for supporting said elements to be coated and configured to convey said elements from the entrance (105) to the exit (106) along a straight pathway, and, a suction system. The opposing sides of the channel are symmetrical about the pathway. Sets of spray guns (103a, 104a, 103b, 104b) for spraying coating powder at the elements are positioned symmetrically either side of the straight pathway. The suction system comprises vertical suction inlets (109a, 109b) mounted opposite one another on each opposing vertical side of the passage, the suction system being configured to provide equal amounts of suction through each of the opposing vertical suction inlets (109a, 109b).

18 Claims, 7 Drawing Sheets (51) Int. Cl.
    *B05B 14/44*    (2018.01)
    *B05B 14/48*    (2018.01)
    *B05B 13/04*    (2006.01)
    *B05B 15/555*   (2018.01)
    *B05C 19/06*    (2006.01)
    *B05B 15/00*    (2018.01)
    *B05B 16/60*    (2018.01)

(52) U.S. Cl.
    CPC .............. *B05B 14/48* (2018.02); *B05B 15/00* (2013.01); *B05B 15/555* (2018.02); *B05B 16/60* (2018.02); *B05B 16/90* (2018.02); *B05C 19/06* (2013.01)

(56) References Cited

U.S. PATENT DOCUMENTS 5,152,839 A    10/1992   Boyce et al.
2004/0058141 A1*   3/2004   Shutic .................... B32B 27/08
                                                  428/314.8
2014/0174346 A1*   6/2014   Shutic .................... B05B 14/41
                                                  118/308

FOREIGN PATENT DOCUMENTS

DE    29624328 U1    2/2002
WO    2017006220 A1   1/2017

OTHER PUBLICATIONS

PCT International Search Report for PCT Application No. PCT/IB2019/051290 dated May 17, 2019, 4 pgs.

Japanese Office Action for JP Application No. 2020-556921, dated May 11, 2021, 2 pgs.

* cited by examiner

COATING BOOTH

CROSS-REFERENCE TO RELATED APPLICATIONS

This application is a National Stage Application of PCT Application No. PCT/IB2019/051290, entitled "COATING BOOTH," filed on Feb. 18, 2019, which is herein incorporated by reference in its entirety, and which claims priority to Great Britain Patent Application No. 1806201.8, entitled "COATING BOOTH," filed on Apr. 16, 2018, which is herein incorporated by reference in its entirety.

FIELD OF INVENTION

The invention relates to a coating booth for coating elongate elements such as extruded section bars hanging in a vertical position from an overhead conveyor line.

INTRODUCTION

Coating booths in continuous coating systems are used to coat elements on a conveyor line. Typically, the elements are translated through a coating booth within which they are sprayed with coating powder by an electrostatic spray gun. Coating powders adhere to the surface of the elements to be coated due to the electrostatic effect.

EP2897740B1 discusses that at present, coating booths are usually in the shape of a parallelepiped tunnel closed at the sides, the bottom, and roof. An overhead conveyor line passes through the two open surfaces at the tunnel entrance and exit. Elements to be coated are hung from the conveyor line and exposed to spray from electrostatic spray guns within the coating booth. Suction inlets located in the sides and roof are used to extract powder that is not deposited on the element.

There are several drawbacks to such booths. For example, the resulting coating can be of poor quality due to a resulting varying thickness in the coat caused by an unequal distribution of powder in the booth. There is a problem of penetration of powder in the grooves of the profile in complex section elements. Such booths are also not efficient because a substantial amount of powder is not deposited on the element and remains suspended in the air or on the internal surfaces of the booth thereby necessitating complex and unhygienic cleaning practices. A further problem is that due to air flow and inertial forces, the elements are susceptible to undesirable swinging motion that can reduce the quality of the resulting coating.

EP2897740B1 proposes a coating booth to overcome some of these drawbacks. The proposed booth has a triangular plan schematically identified by three sides. The element enters and leaves the booth via one side (i.e. taking a curved or angled route through the booth). The remaining two sides are intersected by a vertical suction inlet. One of two sets of spray guns is positioned at each of the point of entry and point of exit of the element from the booth. The spray guns at the entrance and exit point in the direction of travel or against the direction of travel of the element respectively. In this manner, an air flow is provided for powder to be forced past the element and into the suction inlet.

Additionally, each of the two sides intersected by the vertical suction inlet comprises a "conveyor belt" wall that transfers powder deposited on the wall to a scraper that removes such deposited powder.

The booth of EP2897740B1 has several shortcomings. The booth requires a bend/angle in the conveyor line. This creates a risk of elements undergoing undesirable inertial motion as they travel around this bend. This issue intensified when larger elements are to be coated. Furthermore, the width of elements that are compatible with this booth are limited by the relatively confined geometry. This is clear from the Figures of EP2897740B1. Furthermore there is an unsymmetric flow profile within the booth when only one set of spray guns is spraying, which can lead to uneven coating distribution.

The present invention aims to overcome the shortcomings of existing paint booths.

It is also desirable to provide a paint booth having a more efficient suction system than existing paint booths.

SUMMARY

According to a first aspect of the invention there is provided a coating booth for elements to be coated. The coating booth comprises a passage between opposing vertical sides and through which elements to be coated are conveyed. There is an entrance at one end of the passage and an exit at the other end of the passage. The coating booth further comprises a conveyor line for supporting said elements to be coated and configured to convey said elements from the entrance to the exit along a straight pathway, and, a suction system. The opposing sides of the channel are symmetrical about the pathway. Sets of spray guns for spraying coating powder at the elements are positioned symmetrically either side of the straight pathway. The suction system comprises vertical suction inlets mounted opposite one another on each opposing vertical side of the passage, the suction system being configured to provide equal amounts of suction through each of the opposing vertical suction inlets.

The use of a passage having the entrance and exit at each end provides for elements to pass through the paint booth without being subject to dimensional constraints caused by bends in the conveyance path. Furthermore, it is only necessary for booths to be of a similar width to the elements to be coated. In contrast, a triangular paint booth must be wide enough to include an entrance and exit on one side of the booth (and therefore be similar in width to two elements side by side).

The use of a straight conveyor line (along a straight pathway) reduces the amount of inertial motion induced into the elements to be coated as they are moved along the conveyor line, in particular, when the elements are pivotably suspended. In particular, inertial motion in the direction perpendicular to the direction of motion is reduced. This is in contrast to alternative booths that incorporate "V" shape conveyor lines where such inertial motion occurs as the element changes direction.

Suction force is provided to extract any excess coating powder that does not adhere to the element to be coated. The suction system reduces the amount of coating powder particles that either remain suspended in the coating booth, drift out of the coating booth, or, that become adhered to the walls of the coating booth. Providing an equal level of suction force on each side of the passageway helps reduce motion of the elements to be conveyed because the elements are not pulled in either direction due to air flow in the booth. The equal level of suction force also helps ensure that there is an equal distribution of powder distributed onto the element as it passes through the booth.

Optionally, each vertical suction inlet extends substantially along the entire height of the booth.

Optionally, the coating booth comprises systems for hooking elements to be coated to the conveyor line, the hooking systems being configured for horizontal translation and suspended conveyance of the elements to be coated, in a vertical position.

Optionally, the sets of spray guns have reciprocating and controlled movement along a vertical axis so as to be configurable to spray the coating powders along the entire extent of the height of the elements to be coated.

Optionally, the suction system is configured to generate an air flow within the passage that is substantially symmetrical about the pathway.

The symmetrical air flow provides for powder particles to be distributed more evenly around the element to be coated.

Optionally, each vertical suction inlet is divided into an upper and lower portion located on either side of a suction source, each vertical suction inlet further comprising one or more moveable flaps configured to divert an amount of suction force from the suction source to either the upper or lower portions of the vertical suction inlets.

The moveable flaps provide for the suction force to be diverted to a particular vertically defined portion of the booth. This ensures that the suction force available from the suction source is used efficiently. For example, while a top portion of the element is being coated, there is a need for a high suction force to be generated at the corresponding top portion of the booth. In such instance, there is little or no requirement for suction to be provided at a bottom portion of the booth. Diverting the suction force to the relevant lateral portion of the booth improves efficiency of the suction system by avoiding unnecessary suction force being applied to portions of the booth where it is not required.

A further advantage is that the suction force required is reduced. Therefore components and systems that may exist downstream of the suction inlet such as filters and motors can be smaller and require less energy.

Optionally, the external and internal walls of the booth delimiting the sides of the channel comprise closed section sheets of flexible material inserted on and kept tight by motorised rotatable rollers that cause rotation of the sheets past a cleaning means, wherein the cleaning means is configured to remove coating powder deposited on the flexible material.

The cleaning means may comprise a cleaning system. The cleaning system may comprise a scraper configured to scrape powder off the flexible material.

Optionally, each side of the channel comprises two sheets of flexible material extending substantially along the height of the paint booth, and, wherein each vertical suction inlet is positioned in between the two sheets of flexible material of each side.

Such positioning of each vertical suction inlet causes excess powder to be drawn towards one of the sheets of flexible material that are rotated past the cleaning means.

Optionally, the rotatable rollers are configured to rotate when the spray guns are positioned to spray powder at portions of the element lateral to the lower portions of the vertical suction inlets, and, when substantially all available suction force is diverted to the lower portion of the vertical suction inlets.

It has been found that only engaging the rollers in this manner provides for the cleaning means to be more effective.

Optionally, each opposing vertical side of the channel is longitudinally straight and parallel to the pathway.

Optionally, the sets of spray guns comprise a first set of spray guns located proximal to the inlet and a second set of spray guns located proximal to the outlet.

Optionally, the paint booth further comprises a cleaning box having an open top configured to receive any of the sets of spray guns, wherein the sets of spray guns are each operable to rotate to a downward position in order that the nozzles of the sets of spray guns are inserted into the cleaning box. The cleaning box may be configured to provide a blast of air directed at the inserted nozzles of the sets of spray guns to clean the nozzles.

This provides for automated cleaning of the nozzles, for example, when the colour of the coating powder is to be varied. Therefore, there is a reduced risk of powder contamination due to coating powder of a previous colour that may have been deposited on a nozzle surface.

According to a second aspect of the invention there is provided a method of coating elements in a coating booth comprising the steps of:

conveying elements to be coated through a passage between opposing vertical sides from an entrance at one end of the passage to an exit at the other end of the passage, the elements being conveyed along a conveyor line along a straight pathway wherein the opposing sides of the channel being symmetrical about the pathway;

operating sets of spray guns to spray coating powder at elements, the sets of spray guns being positioned symmetrically either side of the straight pathway;

operating a suction system comprising vertical suction inlets mounted opposite one another on each opposing vertical side of the passage, the suction system to providing equal amounts of suction through each of the opposing vertical suction inlets.

Optionally, the elements to be coated are suspended in a vertical position.

Optionally, the method further comprises the step of moving the sets of electrostatic spray guns along a vertical axis so as to spray coating powders along any portion of the height of the elements to be coated.

Optionally, the suction system generates an air flow within the passage that is substantially symmetrical about the pathway.

Optionally, each vertical suction inlet is divided into an upper and lower portion located on either side of a suction source, and further comprising the step of moving one or more flaps of each vertical suction inlet to adjust an amount of suction force from the suction source applying to either the upper or lower portion.

Optionally, the external and internal walls of the booth delimiting the sides of the channel comprise closed section sheets of flexible material inserted on and kept tight by motorised rotatable rollers, the method further comprising the step of rotating the sheets past a cleaning means, wherein the cleaning means is configured to remove coating powder deposited on the flexible material.

Optionally, the method further comprises the step of rotating the rotatable rollers when the spray guns are positioned to spray powder at portions of the element lateral to one of the upper and lower portions of the suction inlet.

Optionally, the method further comprises the steps of cleaning nozzles of the sets of spray guns by rotating the spray guns to a downward position in order that the nozzles of each set of spray guns are inserted into a cleaning box, and, cleaning the inserted nozzles by directing a blast of air at the inserted nozzles within the cleaning box.

DETAILED DESCRIPTION

Figure 1:
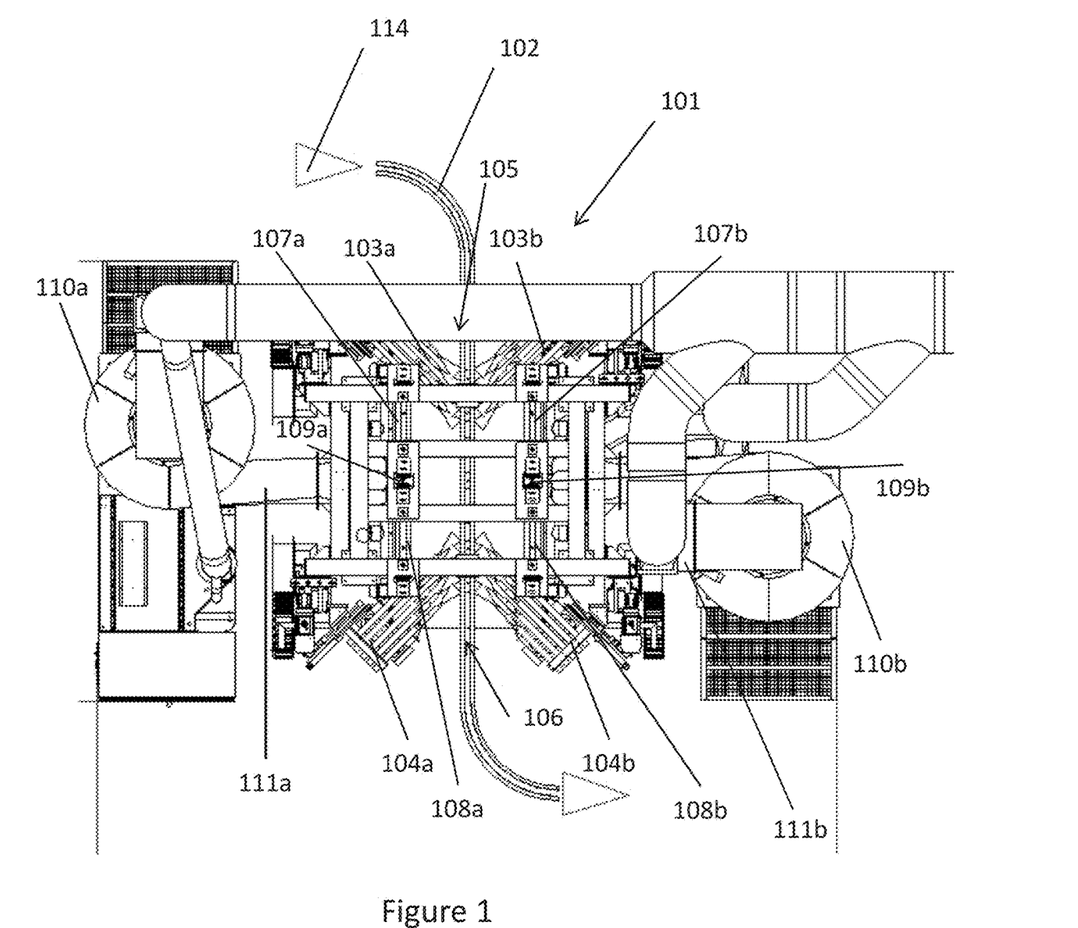
FIG. 1 is a schematic plan view of a paint booth according to an embodiment of the invention.

With reference to FIG. 1 there is a coating booth 101 for receiving and coating elements to be coated (not shown). A conveyor line 102 enters the coating booth 101 at a booth entrance 105 and leaves the coating booth 101 at a booth exit 106. The conveyor line 102 is straight whilst it is within the coating booth 101. Arrow 114 indicates a direction of movement of elements (not shown) along the conveyor line 102.

The sides of the booth 101 are defined by walls 107a, 107b on one side, and, walls 108a, 108b on the other side. The sides are symmetrical about the pathway formed by the portion of the conveyor line 102 within the booth 101.

Vertical suction inlets 109a, 109b are located in between walls 107a, 108a, and, walls 107b, 108b respectively. The suction inlets are symmetrical to each other about the conveyor line 102. The vertical suction inlets 109a, 109b face into the booth 101 for sucking air and suspended excess powder particles out of the booth 101. In the shown embodiment, the vertical suction inlets 109a, 109b are connected via ducts 111a, 111b to a cyclone suction system 110a, 110b. It will be appreciated that any known suction system could be used to provide suction power to the vertical suction inlets 109a, 109b.

There are sets of spray guns 103a, 104a mounted on one side of the conveyor line 102. Opposing sets of spray guns 103b, 104b are mounted symmetrically to sets of spray guns 103a, 104a about the conveyor line 102. In the shown embodiment, spray guns 103a, 103b are mounted proximal to the entrance 105 and angled towards the direction of movement of the conveyor line 102. Spray guns 104a and 104b are mounted proximal to the exit 106 and are angled towards the opposite direction to the direction of movement of the conveyor line. It will be appreciated that in other embodiments the spray guns can be located at different locations longitudinally relative to the conveyor line 102.

The sets of spray guns are fed with powder coating for spraying via powder feed lines (not shown).

In use, elements to be coated (not shown) are conveyed along conveyor line 102 in the direction of arrow 114. Elements are suspended underneath the conveyor line 102 and are translated along a substantially horizontal axis. After the elements enter the booth 101, they are sprayed with coating powder from sets of spray guns 103a 103b. Rear and lateral portions of the elements are therefore coated. Before the elements leave the booth 101, they are sprayed with coating powder from sets of spray guns 104a 104b. Therefore, front and lateral portions of the elements are coated. After leaving the paint booth, at least all the vertical surfaces of the element will be coated.

In embodiments, the powder coating and element are electrostatically charged to be attracted to each-other thereby assisting the coating process.

Vertical suction inlets 109a and 109b each provide an equal amount of suction force. Therefore, the element is not drawn towards either side of the booth 102 as it passes through. Due to the sets of spray guns 103a, 103b, 104a, 104b and vertical suction inlets 109a, 109b being positioned symmetrically about the conveyor line 102, the air flow within the booth 101 is substantially symmetrical. This provides for a substantially even powder coating to be applied to all surfaces the element.

Figure 2:
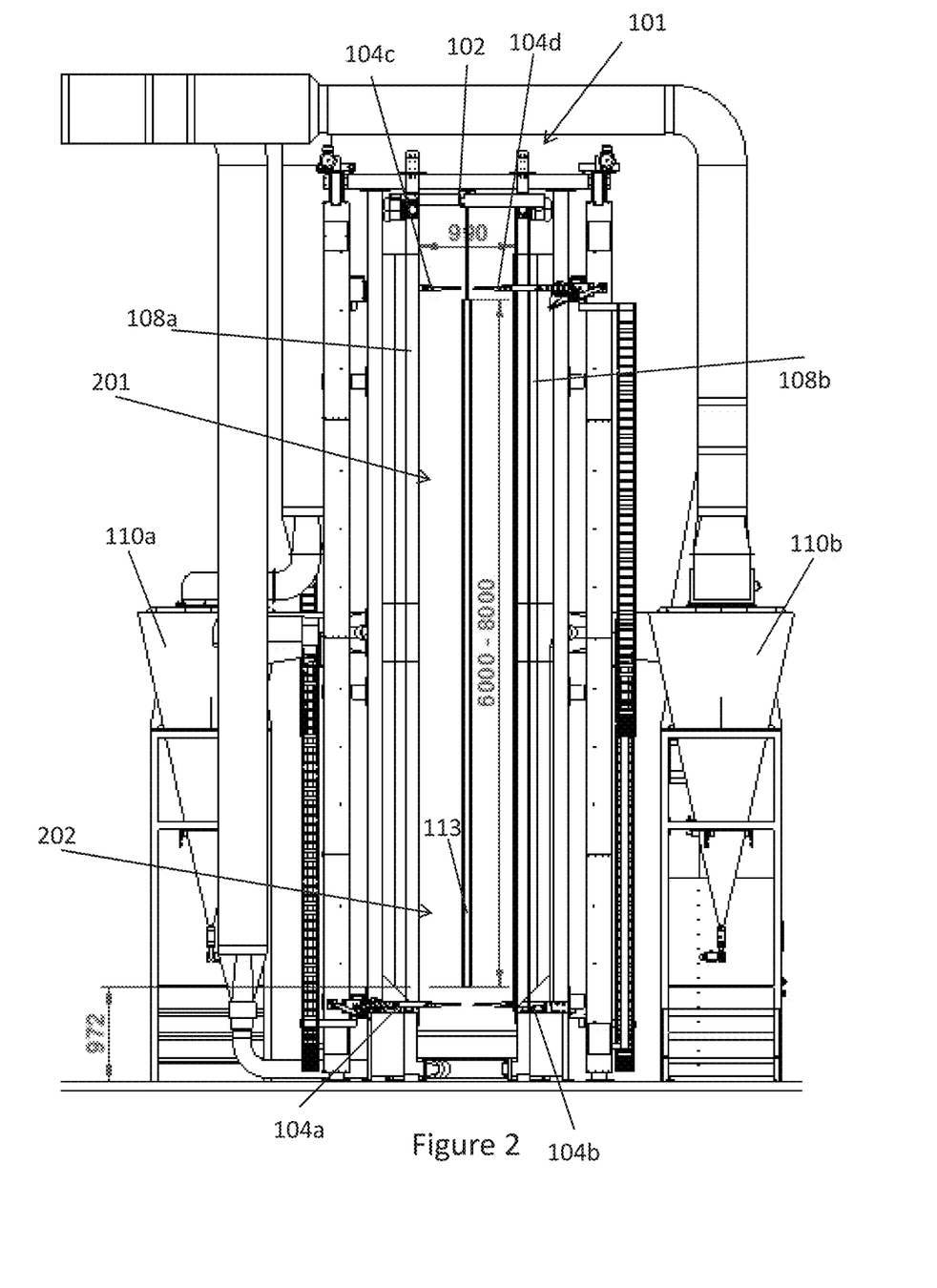
FIG. 2 is a longitudinal side view of the paint booth of FIG. 1.

With reference to FIG. 2 there are shown features having the same reference numerals as discussed with reference to FIG. 1 from a longitudinal-side view. Additionally, there is shown an element to be coated 113 within booth 101, and, there are shown sets of spray guns 104c, 104d located near the top of the booth 101. All sets of spray guns are moveable in the vertical direction in order to spray powder along the entire vertical height of the element 113. The booth 101 is particularly suitable for powder coating elongated elements having substantial length. The booth 101 may be approximately 9 meters high and able to accommodate elements to be coated that are in the region of 6 to 8 meters long. The booth 101 advantageously only needs to be wide enough for an element to pass between the sets of spray guns.

In embodiments, the booth 101 comprises an upper portion 201 and lower portion 202. References to upper and lower portions (for example with respect to vertical suction inlets 109a, 109b) relate to portions that are lateral to the upper and lower portions of the booth respectively.

Figure 3:
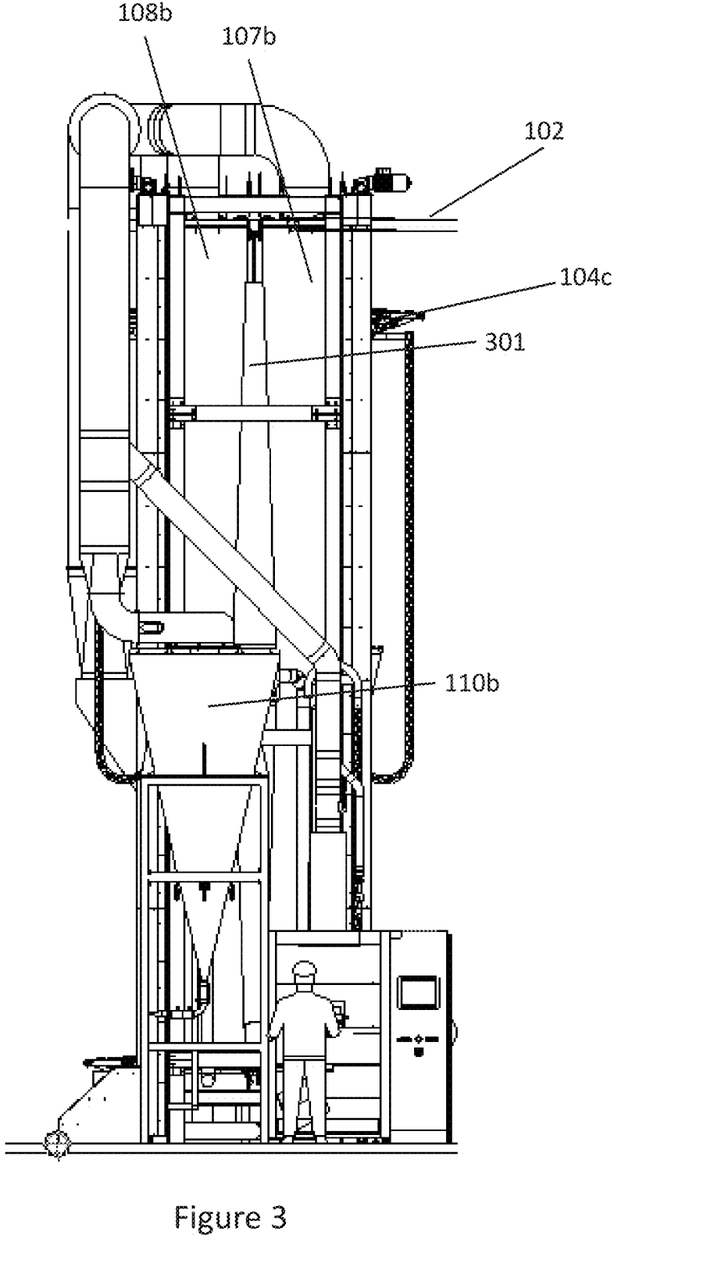
FIG. 3 is a lateral side view of the paint booth of FIGS. 1 and 2.

With reference to FIG. 3 there are shown features having the same reference numerals as discussed with reference to FIG. 1 from a lateral-side view. In the shown embodiment, a vertical suction manifold 301 branching to the vertical suction inlet 109b tapers towards the top and bottom of the booth 101. This ensures that the suction pressure provided remains substantially constant across the height of the booth 101.

Figure 4:
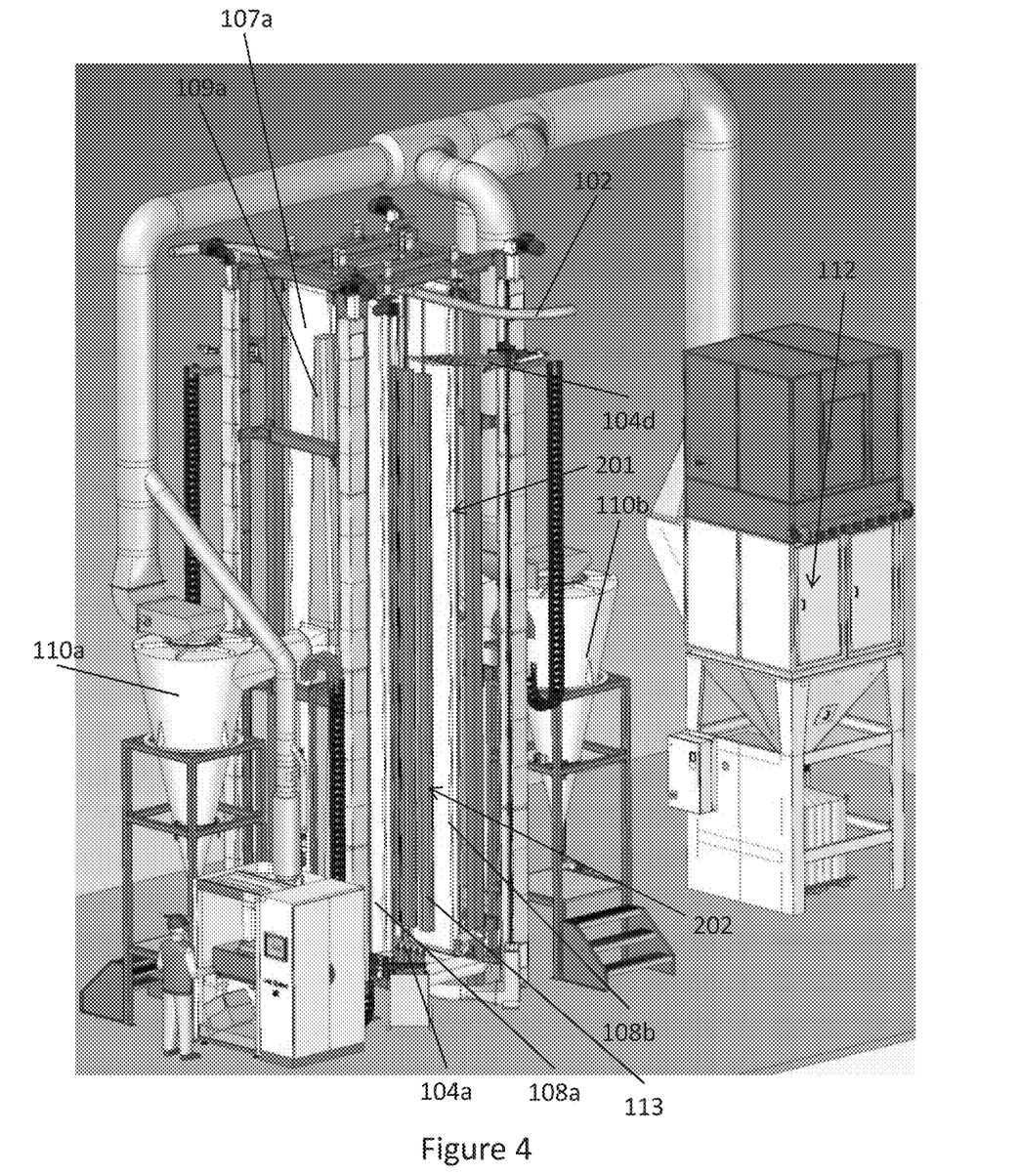
FIG. 4 is an isometric view of the paint booth of FIGS. 1 to 3.

With reference to FIG. 4 there are shown features having the same reference numerals as discussed with reference to the previous figures from an isometric view. In addition, there is shown powder collection unit 112 attached by ducting to cyclone suction systems 110a and 110b. Powder collection unit 112 collects excess powder that is sucked into the vertical suction inlets 109a, 109b.

Figure 5:
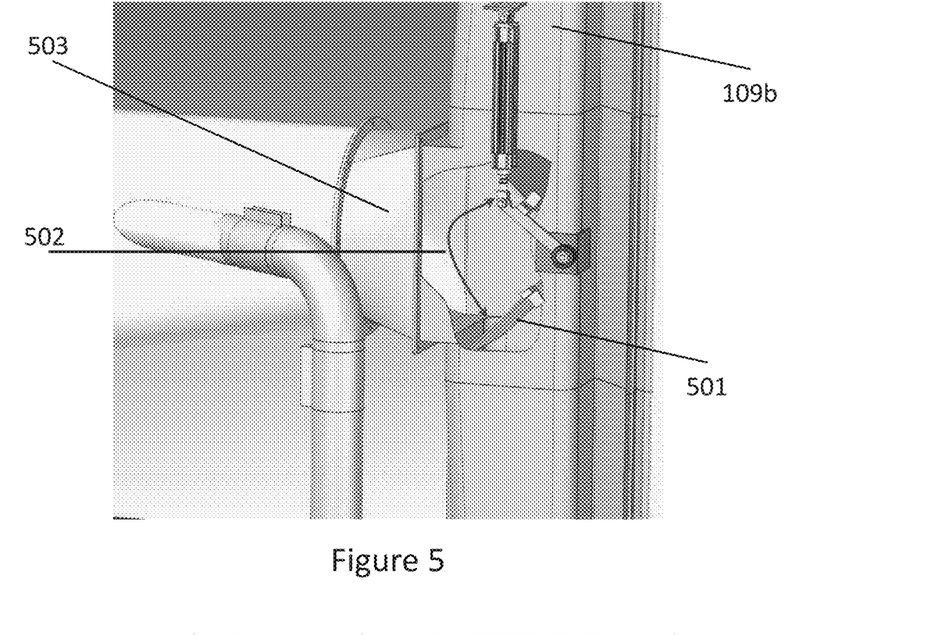
FIG. 5 is an isometric cut-away view of the flap for adjusting the suction force applying to upper or lower portions of the vertical suction inlet of the paint booth according to FIGS. 1 to 4.

With reference to FIG. 5 there is shown a moveable flap 501 located at a junction of the vertical suction inlet 109b (or 109a) and suction source 503. Flap 501 is moveable in the directions indicated by arrow 502. The vertical suction inlet 109b is divided into an upper and lower portion by the flap. When the flap is in the position shown in FIG. 5, the suction source 503 draws in air from the upper portion of the vertical suction inlet 109*b* thereby diverting the suction force to the corresponding upper portion of the booth 101. The flap is moveable to a different position (not shown) to configure the suction source 503 to draw in air from the lower portion of the vertical suction inlet 109*b* thereby diverting the suction force to the corresponding lower portion of the booth 101. In this manner, the available suction force from the suction source 503 can be concentrated at different portions of the vertical suction inlet 109*b*. This reduces the required power of the suction source (and therefore the size of associated suction motors, filters etc.) because suction across the entire vertical suction inlet 109*b* at the same time is not required.

In embodiments, the flaps are located at the vertical mid-points of the vertical suction inlets 109*a*, 109*b* in order that an equal level of suction force is applied across the length of each portion when diverted to either portion.

In other embodiments (not shown), there may be multiple flaps and/or varying degrees of movement of the flap(s). The level of suction force in at different portions of the vertical suction inlet 109*b* can be precisely configured. For example, there may be a high suction force applied to a top portion of the vertical suction inlet 109*b* and a low suction force applied to a bottom portion of the vertical suction inlet 109*b*. The vertical suction inlet 109*b* may be divided into a plurality of portions and a selection of the plurality of portions may be configured by movement of flaps at the boundary of the portions to apply suction force. It is preferable for any flaps to be positioned symmetrically on each opposing vertical suction inlet 109*a*, 109*b* in order to ensure that an air flow that is symmetrical about the conveyor line 102 is maintained.

Figure 6:
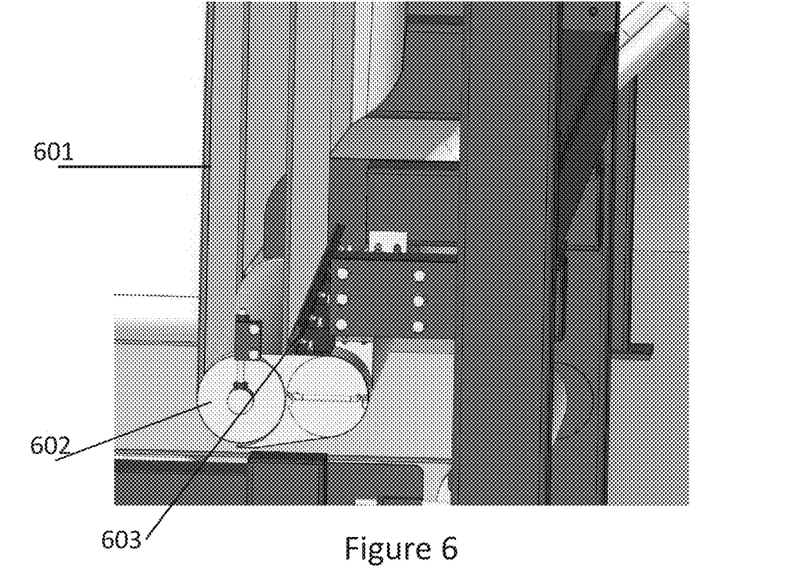
FIG. 6 is a close-up view of one end of the flexible sheet mounted on rotatable rollers defining the sides of the booth including a cleaning means of the paint booth of FIGS. 1 to 4.

With reference to FIG. 6, the walls of the booth 101 each comprise a flexible sheet 601 tightly wound around a top roller (not shown) and a bottom roller 602. A cleaning means is provided for cleaning the sheet when the flexible sheet is rotated by the rollers. In the depicted embodiment the flexible sheet 601 is dragged past a scraper 603 that impinges the flexible sheet 601. When the powder spray guns are operating, excess coating powder adheres to the flexible sheets facing the inside of the booth. Rotation of the flexible sheet past the scraper 603 removes at least some of such excess coating powder thereby cleaning the internal surfaces of the walls of the booth 101. The vertical suction inlet 109*b* is positioned in between two such flexible sheets that make up a side of the booth 101. Excess coating powder in the booth 101 is drawn towards the vertical suction inlets, and therefore also drawn towards the walls of the booth 101 that are cleaned in the manner discussed above.

It has been found that the cleaning means is most effective when substantially all available suction force is concentrated in the lower portion of the booth 101 (i.e by diverting suction force to the lower portion of the vertical suction inlets 109*a*, 109*b* when the spray guns 104 are located lateral to the lower portion of the booth 101). Therefore, in use, it is preferable for the flexible sheet 601 to only be rotated when the spray guns are operating in the lower portion of the booth 101.

Figure 7:
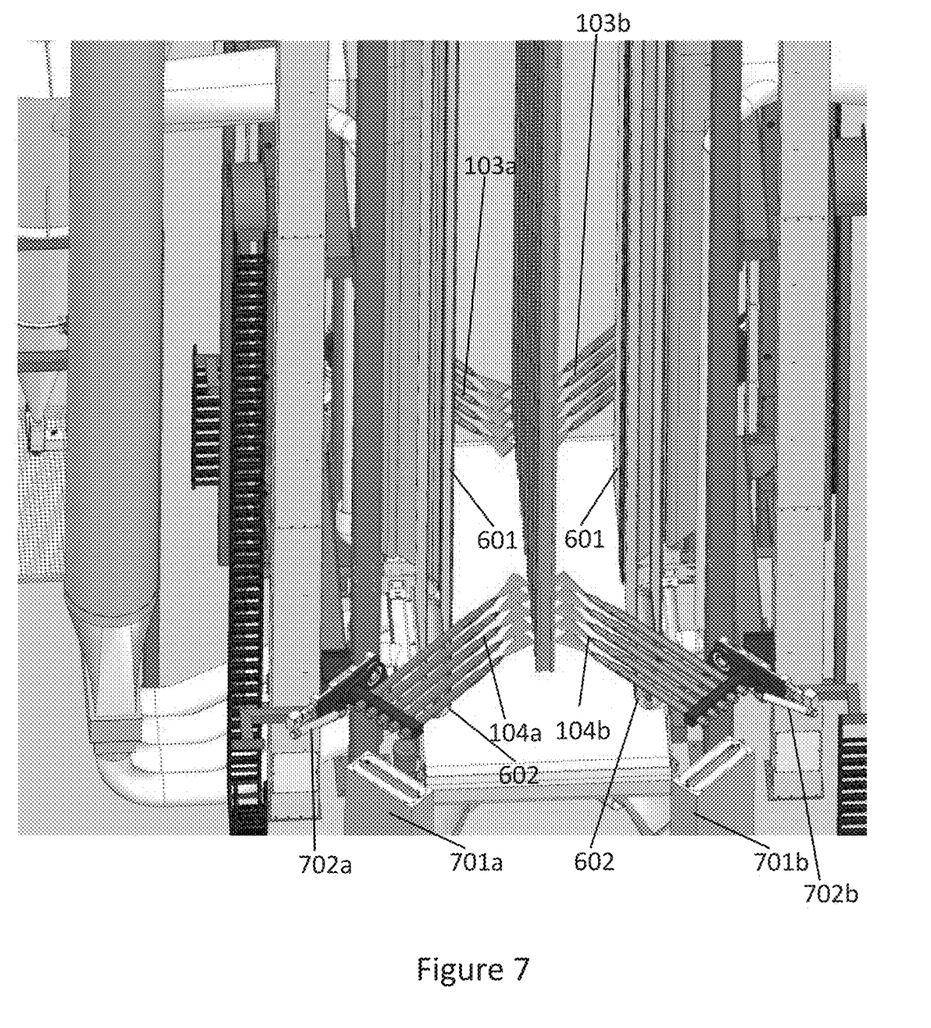
FIG. 7 is a close-up isometric view of the set of spray guns of a paint booth according to an embodiment of the invention.

With reference to FIG. 7 cleaning boxes 701*a* and 701*b* are positioned below the sets of spray guns 104*a*, 104*b*. Boxes 701*a* and 701*b* contain a means for blasting air at a high pressure (such as above atmospheric pressure) within the boxes (not shown).

Pistons 702*a* and 702*b* can be actuated to rotate the spray guns 104*a*, 104*b* so that the nozzles of the sets of spray guns are inserted into the cleaning boxes 701*a* and 701*b*. After the nozzles are inserted into the boxes 701*a*, 701*b*, air is blasted at the nozzles by an air blasting means or air blaster (not shown) thereby cleaning them of excess powder coating that has settled on the nozzles that could serve to contaminate future powder coating, for example, if a powder of a different colour is to be used.

Figure 8A:
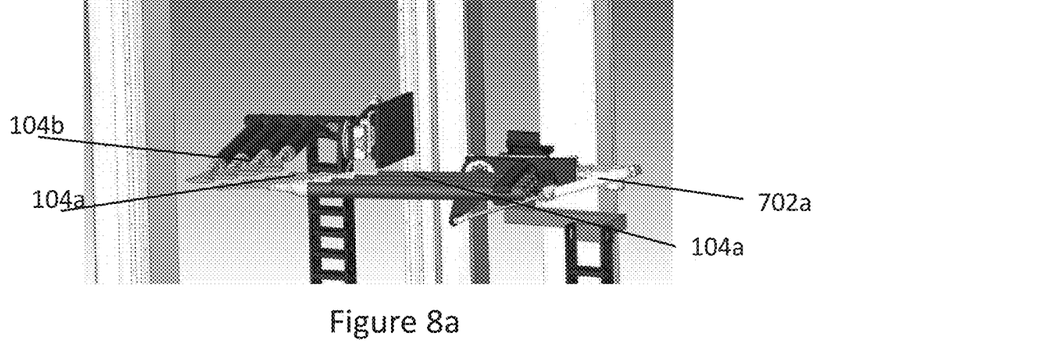
FIGS. 8a to 8c are isometric views of a set of spray guns and associated cleaning box in varying stages of a nozzle cleaning operation according to an embodiment of the invention.
Figure 8B:
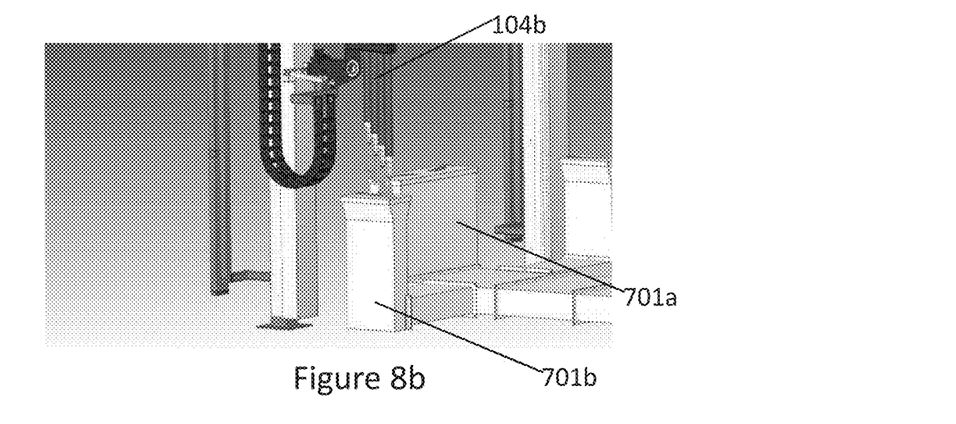
Figure 8C:
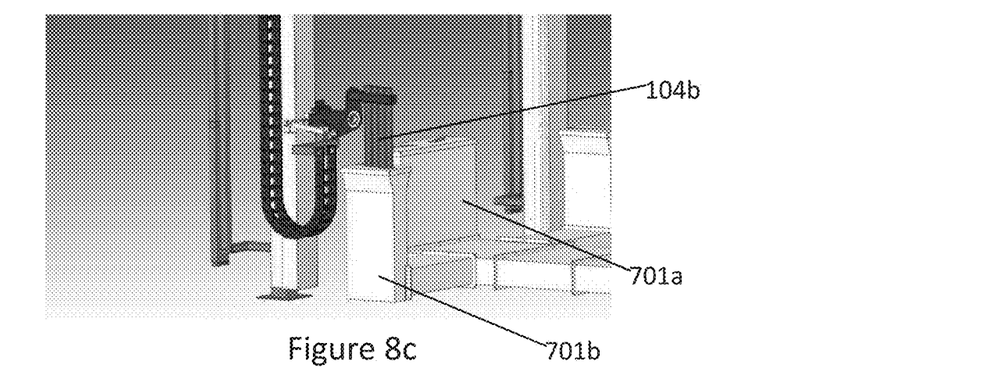

With reference to FIGS. 8*a* to 8*c* the sets of spray guns 104*a*, 104*b* are in a substantially horizontal position whilst spraying (as shown in FIG. 8*a*). Before the nozzles are to be cleaned, the sets of spray guns 104*a*, 104*b* are rotated to be substantially vertical as shown in FIG. 8*b*. The sets of spray guns 104*a*, 104*b* are subsequently inserted into the cleaning boxes 701*a*, 701*b* as shown in FIG. 8*c*. The nozzles are then blasted with high-pressure air by the air blasting means within the cleaning boxes 701*a*, 701*b* (not shown). The blast of air removes excess powder particles that have settled on the nozzles thereby cleaning them and reducing the risk of contamination from previously used powder after a colour change. After the nozzles have been cleaned by the air blasting means, the spray guns are lifted out of the cleaning boxes 701*a*, 701*b* and rotated back to the horizontal position.

The invention claimed is:

1. A coating booth for elements to be coated, comprising a passage between opposing vertical sides and through which said elements to be coated are conveyed, an entrance at one end of the passage and an exit at the other end of the passage;
   a conveyor line for supporting said elements to be coated and configured to convey said elements from the entrance to the exit along a straight pathway; and
   a suction system, wherein:
   the opposing vertical sides of the passage are symmetrical about the straight pathway,
   sets of spray guns for spraying coating powder at the elements are positioned symmetrically about either side of said straight pathway; and
   the suction system comprises vertical suction inlets mounted opposite one another on each opposing vertical side of the passage, the suction system being configured to provide equal amounts of suction through each of the opposing vertical suction inlets, wherein each vertical suction inlet is divided into an upper and lower portion located on either side of a suction source, each vertical suction inlet further comprising one or more moveable flaps configured to divert an amount of suction force from the suction source to either the upper or lower portion of each vertical suction inlet.

2. The coating booth of claim 1, wherein each vertical suction inlet extends substantially along the entire height of the coating booth.

3. The coating booth of claim 1, comprising hooking systems for hooking the elements to be coated to the conveyor line, the hooking systems being configured for horizontal translation and suspended conveyance of the elements to be coated, in a vertical position.

4. The coating booth of claim 1, wherein the sets of spray guns have reciprocating and controlled movement along a vertical axis so as to be configurable to spray the coating powder along the entire extent of the height of the elements to be coated.

5. The coating booth of claim 1, wherein the suction system is configured to generate an air flow within the passage that is substantially symmetrical about the straight pathway.

6. The coating booth to of claim 1, wherein external and internal walls of the booth delimiting the vertical sides of the passage comprise closed section sheets of flexible material inserted on and kept tight by motorised rotatable rollers that cause rotation of the closed section sheets past a cleaning means, wherein the cleaning means is configured to remove excess coating powder deposited on the flexible material.

7. The coating booth to of claim 6, wherein each vertical side of the passage comprises two sheets of flexible material extending substantially along the height of the coating booth, and, wherein each vertical suction inlet is positioned in between the two sheets of flexible material of each side of the booth.

8. The coating booth of claim 7, wherein the motorised rotatable rollers are configured to rotate when the sets of spray guns are positioned to spray powder at portions of the elements lateral to the lower portions of the vertical suction inlets and when substantially all suction force is diverted to the lower portions of the vertical suction inlets.

9. The coating booth of claim 1, wherein each opposing vertical side of the passage is longitudinally straight and parallel to the straight pathway.

10. The coating booth of claim 1, wherein the sets of spray guns comprise a first set of spray guns located proximal to the entrance and a second set of spray guns located proximal to the exit.

11. The coating booth of claim 1, further comprising a cleaning box having an open top configured to receive any of the sets of spray guns, wherein:
    the sets of spray guns are each operable to rotate to a downward position in order that nozzles of the sets of spray guns are inserted into the cleaning box, and
    the cleaning box is configured to provide a blast of air directed at the nozzles of the sets of spray guns to clean the nozzles.

12. A method of coating elements in a coating booth comprising the steps of:
    conveying the elements to be coated through a passage between opposing vertical sides of the coating booth from an entrance at one end of the passage to an exit at the other end of the passage, the elements being conveyed along a conveyor line along a straight pathway, wherein the opposing vertical sides of the passage being symmetrical about the straight pathway;
    operating sets of spray guns to spray coating powder at the elements, the sets of spray guns being positioned symmetrically about either side of the straight pathway;
    operating a suction system comprising vertical suction inlets mounted opposite one another on each opposing vertical side of the passage, the suction system providing equal amounts of suction through each of the vertical suction inlets, wherein each vertical suction inlet is divided into an upper and lower portion located on either side of a suction source; and
    moving one or more flaps of each vertical suction inlet to divert an amount of suction force from the suction source to either the upper or lower portions of the vertical suction inlets.

13. The method of claim 12, wherein the elements to be coated are suspended in a vertical position.

14. The method of claim 12, further comprising the step of moving the sets of spray guns along a vertical axis so as to spray the coating powder along any portion of the height of the elements to be coated.

15. The method of claim 12, wherein the suction system generates an air flow within the passage that is substantially symmetrical about the straight pathway.

16. The method of claim 12, wherein external and internal walls of the coating booth delimiting the vertical sides of the passage comprise closed section sheets of flexible material inserted on and kept tight by motorised rotatable rollers, the method further comprising the step of rotating the closed section sheets past a cleaning means, wherein the cleaning means is configured to remove excess coating powder deposited on the flexible material.

17. The method of claim 16, further comprising the step of rotating the motorised rotatable rollers when the sets of spray guns are positioned to spray coating powder at portions of the elements lateral to the lower portions of the vertical suction inlets and when substantially all available suction force is diverted to the lower portions of the vertical suction inlets.

18. The method of claim 12, further comprising the steps of;
    cleaning nozzles of the sets of spray guns by rotating each set of spray guns to a downward position in order that the nozzles of each set of spray guns are inserted into a cleaning box; and
    cleaning the nozzles by directing a blast of air at the nozzles within the cleaning box.

* * * * *